United States Patent
Kuwahara

(10) Patent No.: US 8,793,513 B2
(45) Date of Patent: Jul. 29, 2014

(54) NETWORK DEVICE

(75) Inventor: Tetsuya Kuwahara, Kyoto (JP)

(73) Assignee: Murata Machinery, Ltd, Kyoto (JP)

( * ) Notice: Subject to any disclaimer, the term of this patent is extended or adjusted under 35 U.S.C. 154(b) by 556 days.

(21) Appl. No.: 12/953,401

(22) Filed: Nov. 23, 2010

(65) Prior Publication Data

US 2011/0292975 A1 Dec. 1, 2011

(30) Foreign Application Priority Data

Nov. 27, 2009 (JP) .................................. 2009-270812

(51) Int. Cl.
*G06F 1/32* (2006.01)
*H04B 7/005* (2006.01)

(52) U.S. Cl.
USPC .......................................... 713/300; 370/278

(58) Field of Classification Search
USPC ........................................................ 713/300
See application file for complete search history.

(56) References Cited

U.S. PATENT DOCUMENTS

| | | | | |
|---|---|---|---|---|
| 7,746,810 B2* | 6/2010 | Sinha et al. | ................... | 370/278 |
| 7,852,818 B2* | 12/2010 | Feder et al. | ................... | 370/338 |
| 8,112,646 B2* | 2/2012 | Tsai | ............................. | 713/320 |
| 2004/0139218 A1* | 7/2004 | Matsushita et al. | ........... | 709/234 |
| 2005/0249227 A1* | 11/2005 | Wang et al. | .................... | 370/412 |
| 2006/0075269 A1* | 4/2006 | Liong et al. | .................... | 713/300 |
| 2006/0193287 A1* | 8/2006 | Ooshima et al. | .............. | 370/328 |

FOREIGN PATENT DOCUMENTS

| | | |
|---|---|---|
| JP | 2001-282398 | 10/2001 |
| JP | 2005-128615 | 5/2005 |
| JP | 2005-311884 | 11/2005 |
| JP | 2009-037285 | 2/2007 |

\* cited by examiner

*Primary Examiner* — Kim Huynh
*Assistant Examiner* — Eric Chang
(74) *Attorney, Agent, or Firm* — Adli Law Group P.C.

(57) ABSTRACT

A network multifunction peripheral includes an NIC that conducts communication with a LAN and a recording unit that can be put in a normal power state and a low-power consumption state. The recording unit processes received data when the recording unit is in the normal power state. The NIC includes a transmit-receive unit that transmits and receives data, a power state determining unit that determines the power state of the recording unit, a start-up signal output unit that outputs a start-up signal when a session establishment request signal is received from a PC and when determined that the recording unit is in the low-power consumption state, and a persistent connection control unit that performs persistent connection control to prohibit the PC from transmitting the data while a session is maintained with the PC until the recording unit is started up.

12 Claims, 7 Drawing Sheets

NETWORK DEVICE

CROSS-REFERENCE TO RELATED APPLICATIONS

This application claims priority under 35 U.S.C. 119 to Japanese Patent Application No. 2009-270812, filed on Nov. 27, 2009, which application is hereby incorporated by reference in its entirety.

BACKGROUND OF THE INVENTION

1. Field of the Invention

The present invention relates to a network device that is used while connected to a network, particularly to a network device that can be put in a low-power consumption state.

2. Description of the Related Art

Recently, from a viewpoint of $CO_2$ emission reduction, there is a social demand for low power consumption of an electric instrument. For example, in a network device connected to a network such as a LAN, there is known a network device, in which only a Network Interface Controller (hereinafter referred to as "NIC") connected directly to the network is operated while power supplies of a CPU and a hard disk are stopped during standby, thereby realizing power saving. An example of the network device is a network printer that transitions to the low-power consumption state, in which the supply of the power to a printer controller, a printer engine, and the like are stopped during standby. In a configuration of such a network printer, only the NIC is operated to wait for print data transmitted from an external host computer (hereinafter also referred to as "communication terminal") when the network printer is in the low-power consumption state, and the printer controller and the like are returned from the low-power consumption state to a normal power state when the print data is received.

In this case, print data processing cannot be performed when the printer controller and the like are being started up. In order not to receive the print data during the start-up, there is considered a configuration in which a session is not established with the communication terminal when starting up the printer controller and the like. However, with such a configuration, the communication terminal repeatedly transmits a session establishment request at predetermined time intervals. Therefore, even if the start-up of the printer controller and the like is ended to be able to establish the session with the communication terminal, the session cannot be established until the communication terminal transmits the session establishment request again. Therefore, the receive processing and the print data processing cannot be started although the print data processing can be performed, which causes a problem in that the start of the processing is delayed. Further, when the session is timed out because a response is not received for a predetermined time or more, a determination is made that the session cannot be established, to possibly generate an error on the communication terminal side.

In order to solve the above problems, for example, there is a multifunction peripheral that prohibits the data transmission by continuously transmitting a denial signal (NACK) to a source (communication terminal) of a print request until a confirmation that a PDL board returns to an operable state can be obtained. In the multifunction peripheral, when a main board receives a print request from a terminal device through an interface in an energy-saving mode, a function of a power supply circuit is activated to start the return to the normal mode from the energy-saving mode through a standby mode. At the same time, a control unit of the main board monitors the state of the PDL board, and the control unit transmits the denial signal (NACK) to the source of the print request to prohibit the terminal device from performing the data transmission until a confirmation that the return of the PDL board to the operable state is completed can be obtained. When the completion of the return is confirmed, a signal (ACK) for permitting the print request is transmitted to the source to permit the data transmission.

However, in a network communication control, a protocol that can use the signal NACK is limited to a specific protocol (such as an LPR protocol (Line Printer daemon protocol)). Moreover, even if the LPR protocol is used, the signal NACK is ignored and will not-function effectively when a host computer adopts Windows (registered trademark, hereinafter the same) as an Operating System (OS). Accordingly, the control method performed by the above multifunction peripheral does not function effectively for the communication terminal in which a protocol except the LPR protocol is used and the communication terminal in which Windows is adopted as the OS. That is, —the conventional network device has poor versatility.

SUMMARY OF THE INVENTION

The present invention has been made to overcome the problems described above. An object of the present invention is to provide a network device in which, during start-up from a second power state, data transmission performed by a communication terminal can be controlled while unconstrained by a protocol used and an OS of the communication terminal that is a data source.

A network device of the present invention includes a communication unit and a processing unit. The communication unit is connected to the communication terminal through a network, and conducts communication with a communication terminal. The processing unit is connected to the communication unit through a communication channel, the processing unit that is put in a first power state and a second power state whose power consumption is smaller than that of the first power state, and the processing unit processes received data received from the communication unit when the processing unit is in the first power state. Further, the communication unit includes a transmit-receive unit, a determination unit, a transition unit, and a persistent connection control unit. The transmit-receive unit transmits and receives data to and from the communication terminal through the network. The determination unit determines the power state of the processing unit. The transition unit outputs a transition signal for causing the power state of the processing unit to transition to the first power state, when the transmit-receive unit receives the data from the communication terminal and when the determination unit determines that the processing unit is in the second power state. The persistent connection control unit establishes a session with the communication terminal when the transmit-receive unit receives a session establishment request signal from the communication terminal and when the transition unit outputs a transition signal, and the persistent connection control unit performs persistent connection control to prohibit the communication terminal from transmitting data while the session is maintained until the power state of the processing unit transitions to the first power state.

The network device according to the present invention includes the communication unit and the processing unit. For example, during standby, the processing unit is put into the second power state (low-power consumption state) in which the power consumption becomes less, and only the communication unit runs to perform the data waiting operation. During the waiting period for the data, the power consumption can be set at less than that of the first power state except for apart of the network device, that is, the communication unit. Therefore, the power consumption of the network device can be reduced. When the session establishment request signal is received through the network, the session is established with the communication terminal, and the transition signal is outputted to the processing unit. Until the power state of the processing unit transitions to the first power state (start-up), the persistent connection control is performed to prohibit the communication terminal from transmitting the data while the session is maintained. Therefore, when the processing unit is being started up from the second power state, the data transmission performed by the communication terminal can be controlled while unconstrained by the protocol used and the OS of the communication terminal that is the data source.

The above network device is preferably configured as follows. That is, the communication unit includes a receive buffer in which received data received from the communication terminal is temporarily stored. The transmit-receive unit transmits a receivable data amount corresponding to a free space of the receive buffer to the communication terminal according to a predetermined communication protocol. The persistent connection control unit decreases a data amount read from the receive buffer compared with non-persistent connection control such that the receivable data amount is smaller than a minimum transmittable data amount of the communication terminal until the determination unit determines that the power state of the processing unit has transitioned to the first power state.

Accordingly, until the power state of the processing unit transitions to the first power state (start-up), the data amount read from the receive buffer is decreased compared with the non-persistent connection control (that is, the normal control) such that the receivable data amount is smaller than the minimum transmittable data amount of the communication terminal. Therefore, since the data amount read from the receive buffer is smaller than the data amount received from the communication terminal, the free space of the receive buffer is reduced, and a value (typically, zero) smaller than the minimum transmittable data amount of the communication terminal is transmitted as the receivable data amount to the communication terminal. As a result, while the session is maintained, the data transmission performed by the communication terminal can be suppressed, that is, the persistent connection control can be realized.

The above network device is preferably configured as follows. That is, the persistent connection control unit ends the persistent connection control to permit the communication terminal that has transmitted the session establishment signal to transmit the data when the determination unit determines that the power state has transitioned to the first power state.

In this case, the persistent connection control is ended, when the transition (start-up) of the power state of the processing unit to the first power state is completed to be able to perform the data processing of the received data. Therefore, the communication terminal is permitted to transmit the data. Because the session is already maintained at the time the persistent connection control is released, the data communication can be rapidly started.

The above network device is preferably configured as follows. That is, the persistent connection control unit increases the data amount read from the receive buffer compared with the persistent connection control such that the receivable data amount is larger than the minimum transmittable data amount of the communication terminal when ending the persistent connection control to permit the communication terminal that has transmitted the session establishment signal to transmit the data.

In this case, when the power state of the processing unit transitions to the first power state (start-up) to end the persistent connection control, the data amount read from the receive buffer is increased compared with the persistent connection control, and the free space (that is, the receivable data amount) of the receive buffer is set larger than the minimum transmittable data of the communication terminal. The data size corresponding to the free space is transmitted as the receivable data amount to the communication terminal that has transmitted the session establishment request signal. Therefore, the communication terminal can transmit the transmitted data, and the transition from the persistent connection control to the normal control can smoothly be made after the power state of the processing unit has transitioned to the first power state.

The above network device is preferably configured as follows. That is, the predetermined communication protocol is TCP/IP.

The above network device is preferably configured as follows. That is, the transmit-receive unit transmits a value of zero as the receivable data amount to the communication terminal when the free space of the receive buffer is smaller than a predetermined value while the persistent connection control unit performs the persistent connection control.

The above network device is preferably configured as follows. That is, the communication unit includes a storage unit in which the received data read from the receive buffer is stored. In the above network device, the received data stored in the storage unit is transferred to the processing unit when the determination unit determines that the power state of the processing unit has transitioned to the first power state.

The above network device is preferably configured as follows. That is, the communication unit includes a transition determination unit for determining whether the power state of the processing unit needs to be transitioned to the first power state when the data is received by the transmit-receive unit and when the determination unit determines that the processing unit is in the second power state. The transition unit outputs the transition signal when the transition determination unit determines that the power state of the processing unit needs to be transitioned to the first power state, and the persistent connection control unit prohibits the communication terminal from transmitting the data while the session is maintained until the power state of the processing unit transitions to the first power state, when the transition determination unit determines that the power state of the processing unit needs to be transitioned to the first power state.

In this case, the power state of the processing unit transitions to the first power state only when the power state of the processing unit needs to be transitioned to the first power state (start-up). Therefore, the running time of the processing unit can be suppressed to the minimum, and the power consumption of the network device can further be reduced.

The above network device is preferably configured as follows. That is, the communication unit includes a production unit for producing a response to the data received by the transmit-receive unit when the transition determination unit determines that the power state of the processing unit need not be transitioned to the first power state. The transmit-receive unit outputs the response produced by the production unit to the communication terminal when the transition determination unit determines that the power state of the processing unit need not be transitioned to the first power state.

Accordingly, when the power state of the processing unit need not be transitioned to the first power state (start-up), the power state of the processing unit does not transition to the first power state, and a response to the received data is performed on the communication unit side. Therefore, the unnecessary transition of the power state of the processing unit to the first power state can be suppressed, and the power consumption of the network device can further be reduced.

The above network device is preferably configured as follows. That is, in the network device according to the present invention, the processing unit is a printer that prints out print data received by the communication unit onto a sheet.

The above network device is preferably configured as follows. That is, the persistent connection control unit controls the transmit-receive unit such that a value smaller than a minimum transmittable data amount of the communication terminal is transmitted as the receivable data amount to the communication terminal according to a predetermined communication protocol, until the determination unit determines that the power state of the processing unit has transitioned to the first power state.

Accordingly, the persistent connection control can be realized without adjusting the read amount from the receive buffer by directly manipulating the receivable data amount included in the transmitted data.

The above network device is preferably configured as follows. That is, the communication unit includes a receive buffer in which received data received from the communication terminal is temporarily stored. The transmit-receive unit transmits a receivable data amount corresponding to a free space of the receive buffer to the communication terminal according to a predetermined communication protocol. The persistent connection control unit controls the transmit-receive unit such that a value smaller than a minimum transmittable data amount of the communication terminal is transmitted as a receivable data amount irrespective of the receivable data amount according to a predetermined communication protocol, until the determination unit determines that the power state of the processing unit has transitioned to the first power state.

According to the present invention, when the processing unit is being started up from the low-power consumption state, the data transmission performed by the communication terminal can be controlled while unconstrained by the protocol used and the OS of the communication terminal that is the data source.

Other features, elements, processes, steps, characteristics and advantages of the present invention will become more apparent from the following detailed description of preferred embodiments of the present invention with reference to the attached drawings.

DETAILED DESCRIPTION OF PREFERRED EMBODIMENTS

Figure 1:
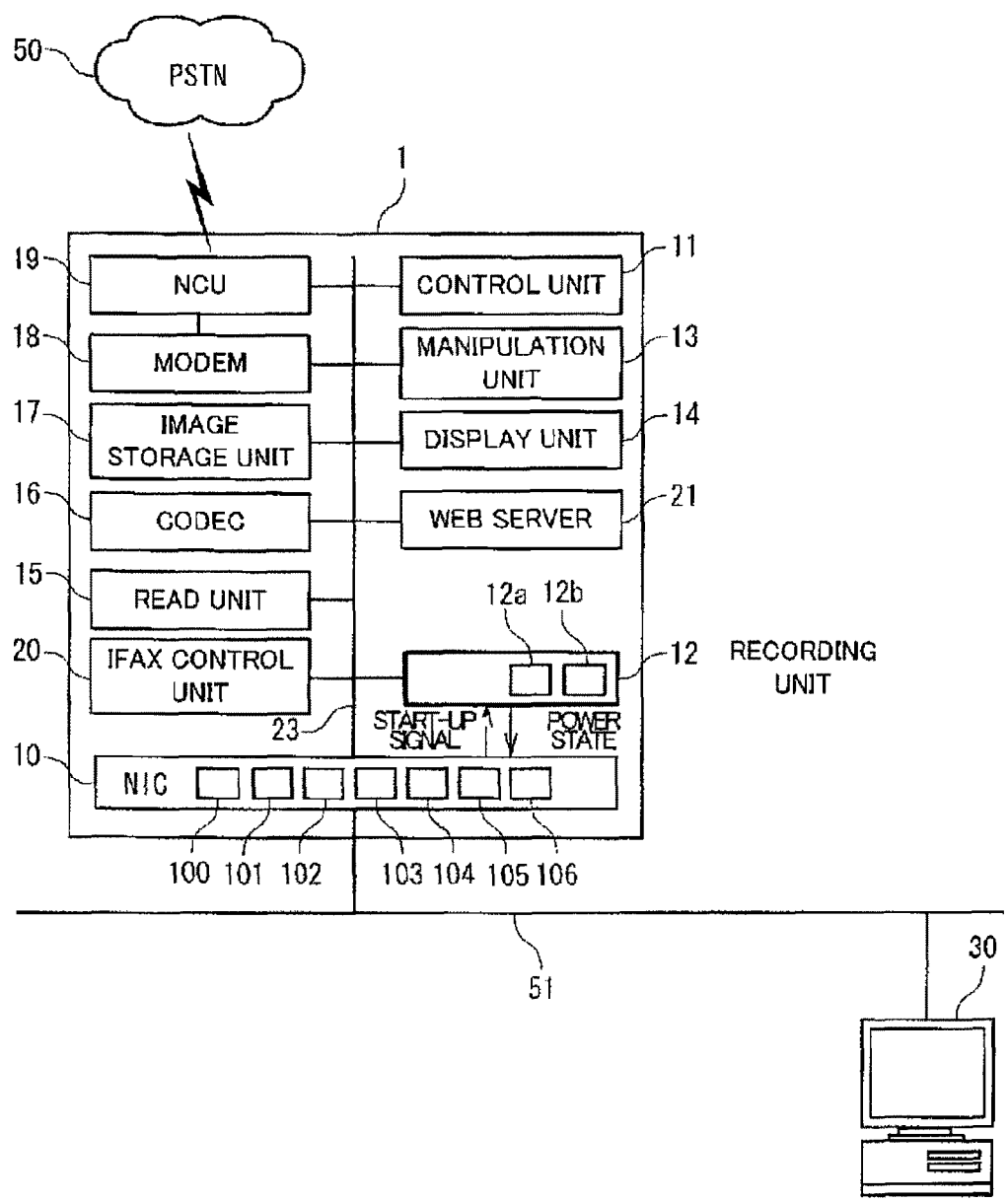
FIG. 1 is a block diagram illustrating an entire configuration of a network multifunction peripheral according to an embodiment.
Figure 2:
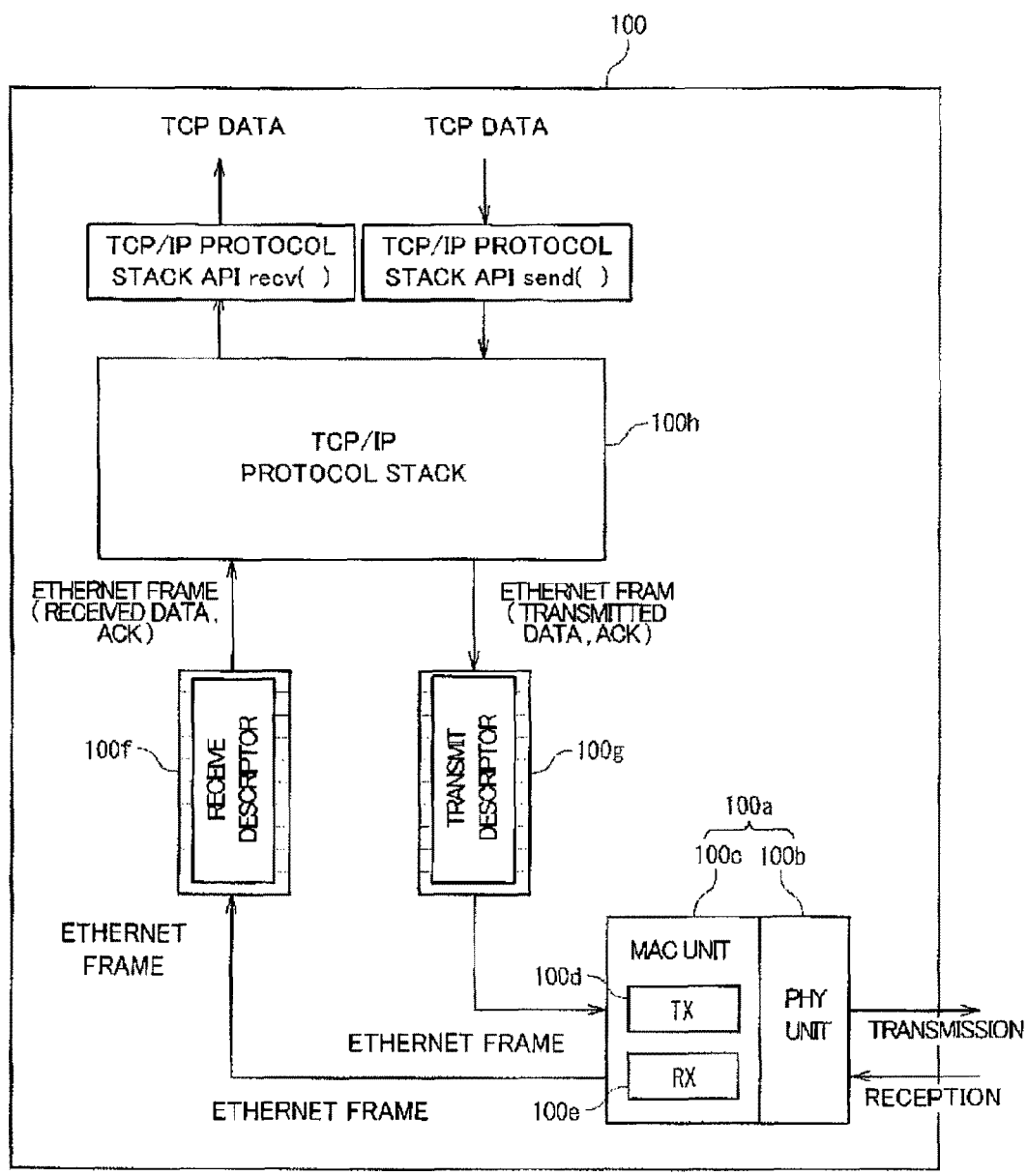
FIG. 2 is a block diagram illustrating a configuration of a transmit-receive unit of an NIC constituting the network multifunction peripheral.

Hereinafter, preferred embodiments of the present invention will be described with reference to the drawings. In the drawings, the same constituent is designated by the same reference numeral, and overlapping description will not be given. A network multifunction peripheral (MFP) is described as an example of a network device according to an embodiment. A network system in which the network multifunction peripheral is connected to a personal computer (hereinafter referred to as "PC", and corresponds to a communication terminal described in the claims) through a LAN is described by way of example. A configuration of the network system described by way of example is simplified for the sake of easy understanding. First, an entire configuration of a network multifunction peripheral 1 will be described with reference to FIGS. 1 and 2. FIG. 1 is a block diagram illustrating the entire configuration of the network multifunction peripheral 1 connected to a LAN 51. FIG. 2 is a block diagram illustrating a configuration of a transmit-receive unit 100 of an NIC 10 constituting the network multifunction peripheral 1.

The network multifunction peripheral 1 is a network multifunction peripheral that can be put in a low-power consumption state (energy-saving mode) during standby. The network multifunction peripheral 1 includes a scanner function of reading a document to produce image data, a copy function of recording the image data onto a sheet, a FAX receiving function of recording the image data received through facsimile communication onto the sheet, and a PC print function of recording the image data received from a PC 30 connected through the LAN 51 onto the sheet. In addition to a FAX transmitting function of transmitting a facsimile of the read image data, the network multifunction peripheral 1 includes a PC-FAX function of transmitting the facsimile of the image data received from the external PC 30. The network multifunction peripheral 1 further includes an Internet FAX (IFAX) function of transmitting and receiving the image data through an IP network by utilizing an electronic mail.

In order to realize these functions, the network multifunction peripheral 1 includes the NIC 10, a control unit 11, a recording unit 12, a manipulation unit 13, a display unit 14, a read unit 15, a codec 16, an image storage unit 17, a modem 18, an NCU 19, an IFAX control unit 20, and a Web server 21. The units are connected through a bus 23 (which corresponds to a communication channel described in the claims) such as Peripheral Component Interconnect (PCI) and PCI Express while being able to conduct communication to each other. In this case, the NIC 10 corresponds to a communication unit described in the claims, and other units from the control unit 11 to the Web server 21 except the NIC 10 correspond to a processing unit described in the claims. Hereinafter, there will be described a case where, by way of example, the recording unit 12 is put in a low-power consumption state (which corresponds to a second power state described in the claims) and a normal power state (which corresponds to a first power state described in the claims), and print data is transmitted from the PC 30 through the LAN 51.

The NIC 10 is a network interface that performs transmit-receive control processing to various communication protocols and data analysis processing and data production processing on various communication protocols. The NIC 10 is connected to the PC 30 through the LAN 51, and the NIC 10 can conduct data communication with the PC 30 according to, for example, TCP/IP. Electric power is supplied to the NIC 10 even if the network multifunction peripheral 1 is in the standby state, that is, the low-power consumption state (energy-saving mode).

The NIC 10 includes a microprocessor that performs an operation, a ROM in which a program for causing the microprocessor to perform each piece of processing is stored, a communication chip (IC) that is controlled by the microprocessor to perform the communication processing, and a RAM in which received data is temporarily stored. The received data is received by the communication chip and is read from the communication chip. The NIC 10 may be configured using a microcomputer in which the microprocessor, the communication chip, the ROM, and the RAM are accommodated in one chip.

In the NIC 10, a transmit-receive unit 100, a storage unit 101, a power state determining unit 102, a start-up necessity determining unit 103, a start-up signal output unit 104, a response data producing unit 105, and a persistent connection control unit 106 are structured by a combination of the above-described hardware and software.

For example, the transmit-receive unit 100 receives a network packet (such as print data) from the PC 30 through the LAN 51. The transmit-receive unit 100 outputs response data and the like produced by the response data producing unit 105 and the like to the PC 30 through the LAN 51. As illustrated in FIG. 2, the transmit-receive unit 100 includes a LAN device unit 100*a*, a receive buffer 100*f*, a transmit buffer 100*g*, and a TCP/IP protocol stack 100*h*.

The LAN device unit 100*a* includes a PHY (PHYsical Layer) unit 100*b* that converts a logic signal and an electric signal in the interface such as Ethernet (registered trademark, hereinafter the same) and a MAC unit 100*c* that includes a transmit (TX) unit 100*d* and a receive (RX) unit 100*e*. The MAC unit 100*c* takes out received data (Ethernet frame) from the PHY unit 100*b* through the receive unit 100*e*, and stores the received data in a receive buffer 100*f* specified by a receive descriptor. The MAC unit 100*c* outputs transmitted data (Ethernet frame) to the PHY unit 100*b* through the transmit unit 100*d* from a transmit buffer 100*g* specified by a transmit descriptor. Herein, each of the receive buffer 100*f* and the transmit buffer 100*g* has a ring structure (or a chain structure). A beginning address or the like of the receive buffer 100*f* in which the received data is stored is recorded in the receive descriptor, and a beginning address or the like of the transmit buffer 100*g* in which the pieces of data waiting for its turn of transmission are stored is recorded in the transmit descriptor.

The TCP/IP protocol stack 100*h* is a software group in which protocols necessary to realize the functions on the network are stacked in a hierarchical state. The TCP/IP protocol stack 100*h* includes an application layer, a transport layer, an Internet protocol (IP) layer, and a physical layer. When the packet passes through the TCP/IP protocol stack 100*h*, the protocol of each layer adds a field to a basic header or deletes the field from the basic header. A recv function of a TCP/IP protocol stack Application Programming Interface (API) is used to read (receiving manipulation) received data (TCP data) from the receive buffer 100*f* through the TCP/IP protocol stack 100*h*. The transmitted data can be obtained through the recv function. On the other hand, a send function of the TCP/IP protocol stack API is used to transmit data through a socket in which the connection is established. The transmitted data can be written (transmitting operation) in the transmit buffer 100*g* through the TCP/IP protocol stack 100*h* by utilizing the send function.

For example, the power state determining unit 102 determines the power state of the recording unit 12 based on a level (Hi or Low) of a port connected to the recording unit 12. Specifically, the power state determining unit 102 determines that the recording unit 12 is in the normal power state (normal mode) when the port level is Hi (5 V), and determines that the recording unit 12 is in the low-power consumption state (energy-saving mode) when the port level is Low (0 V). That is, the power state determining unit 102 acts as a determination unit described in the claims.

The start-up necessity determining unit 103 determines whether the recording unit 12 needs to be started up (that is, the power state of the recording unit 12 transitions to the normal power state), when the transmit-receive unit 100 receives the network packet (data) and when the power state determining unit 102 determines that the recording unit 12 is in the low-power consumption state. That is, the start-up necessity determining unit 103 corresponds to a transition determination unit described in the claims. In this case, the determination as to whether the recording unit 12 needs to be started up is made based on whether a response can be performed only by the NIC 10. Examples of the case where the response can be performed only by the NIC 10 include a Get Printer Attribute response, an ARP response, an SNMP response, an ICMP response (for example, Ping packet response) of IPP, which are TCP/IP-level commands regularly transmitted from the PC 30 to the NIC 10. On the other hand, network print control in which TCP/IP such as LPD, Port, and IPP is used is cited as an example of the case where the response cannot be performed only by the NIC 10.

When the start-up necessity determining unit 103 determines that the recording unit 12 needs to be started up, the start-up signal output unit 104 outputs a start-up signal, which causes the recording unit 12 to transition from the low-power consumption state to the normal power state, to the recording unit 12 or a power control unit that controls the supply of the power. That is, the start-up signal output unit 104 acts as a transition unit described in the claims. The supply of the power to the recording unit 12 is started when the start-up signal output unit 104 outputs the start-up signal. Start-up processing such as program load is performed in the recording unit 12, thereby starting up the recording unit 12. The port level is set to Hi when the start-up of the recording unit 12 is completed.

The response data producing unit 105 produces response data with respect to the data received by the transmit-receive unit 100 when the start-up necessity determining unit 103 determines that the recording unit 12 need not be started up. For example, the response data producing unit 105 produces the response data with respect to the Get Printer Attribute, ARP, SNMP, and ICMP. That is, the response data producing unit 105 acts as a production unit described in the claims. The response data produced by the response data producing unit 105 is outputted to the transmit-receive unit 100.

For example, the persistent connection control unit 106 establishes a session with the PC 30 that has transmitted a session establishment request signal when the transmit-receive unit 100 receives the session establishment request signal from the PC 30. The persistent connection control unit 106 then determines whether the recording unit 12 is in the normal power state (that is, the recording unit 12 is in the state in which the print processing can be performed) based on the determination result of the power state determining unit 102. When the recording unit 12 is in the low-power consumption state (that is, the recording unit 12 is in the state in which the print processing cannot be performed), the persistent connection control unit 106 performs persistent connection control (keep alive) to prohibit the PC 30 from transmitting the data while the session is maintained until the power state determining unit 102 determines that the recording unit 12 has transitioned from the low-power consumption state to the normal power state. On the other hand, when the recording unit 12 is in the normal power state, the persistent connection control unit 106 permits the PC 30 to transmit the data without performing the persistent connection control. That is, the persistent connection control unit 106 acts as a persistent connection control unit described in the claims.

As described above, the transmit-receive unit 100 constituting the NIC 10 includes the receive buffer 100$f$ having a capacity of, for example, about 4 K bytes in which the received data received from the PC 30 and the like through a predetermined port is temporarily stored, and the transmit-receive unit 100 transmits to the PC 30 and the like a receivable data amount corresponding to a free space of the receive buffer 100$f$ according to TCP/IP. When the free space of the receive buffer 100$f$ becomes a predetermined value or less (for example, a half or less), the transmit-receive unit 100 may transmit a value of zero as the receivable data amount. When the recording unit 12 is determined to be in the low-power consumption state, the persistent connection control unit 106 decreases the data amount (for example, several bytes to several ten of bytes) read from the receive buffer 100$f$ using the recv function, compared with non-persistent connection control (that is, the normal control) such that the receivable data amount becomes smaller than a minimum transmittable data amount of the PC 30 until the recording unit 12 is determined to have transitioned from the low-power consumption state to the normal power state. Thus, the persistent connection control unit 106 adjusts the data amount read from the receive buffer 100$f$ through TCP/IP protocol stack 100$h$, thereby realizing the persistent connection control.

In performing the persistent connection control, the persistent connection control unit 106 ends the persistent connection control when the recording unit 12 is determined to have transitioned from the low-power consumption state to the normal power state (that is, when the recording unit 12 is started up), and the persistent connection control unit 106 permits the PC 30 that has transmitted the session establishment request signal to transmit the data. In this case, when ending the persistent connection control to permit the PC 30 to transmit the data, the persistent connection control unit 106 increases the data amount (for example, several hundred bytes to several thousand bytes), read from the receive buffer 100$f$ using the recv function, compared with the persistent connection control such that the receivable data amount is larger than the minimum transmittable data amount of the PC 30, thereby realizing the transition to the normal control (non-persistent connection control).

Returning to FIG. 1, the control unit 11 includes a microprocessor that performs an operation, a ROM in which a program for causing the microprocessor to perform each piece of processing is stored, a RAM in which various pieces of data such as operation result is temporarily stored, and a backup RAM in which backup data is stored. The control unit 11 executes the program stored in the ROM, thereby wholly controlling the hardware constituting the network multifunction peripheral 1.

The recording unit 12 is an electrophotographic printer. For example, the recording unit 12 prints out print data (such as PDL data) received from the external PC 30 connected through the LAN 51, onto the sheet. The recording unit 12 also prints out the image data read and produced by the read unit 15 and the image data received by FAX and IFAX onto the sheet. Therefore, the recording unit 12 includes a printer controller 12$a$ and a printer engine 12$b$. When the print out is not performed for a predetermined time, the power of the control unit 11 and the recording unit 12 are cut off to become the low-power consumption state. On the other hand, as described above, the supply of the power is started in response to the start-up signal outputted from the start-up signal output unit 104, and the control unit 11 and the recording unit 12 become the normal power state.

The printer controller 12$a$ includes a microprocessor that performs an operation, a nonvolatile flash memory (ROM) in which a language processing program and font data are stored, and a RAM. The language processing program causing the microprocessor to perform processing and the font data are loaded from the flash memory and stored in the RAM, and various pieces of data such as the operation result are temporarily stored in the RAM. The printer controller 12$a$ executes the language processing program and the like loaded on the RAM, thereby realizing a function of expanding the print data (PDL data) to raster data and a function of controlling the printer engine 12$b$. The printer controller 12$a$ outputs the expanded raster data to the printer engine 12$b$.

The printer engine 12$b$ is a print mechanism that performs printing. The printer engine 12$b$ is controlled by the printer controller 12$a$, and prints the raster data inputted from the printer controller 12$a$ onto the sheet. More particularly, the printer engine 12$b$ prints the raster data by performing printing processes such as sheet feed, charging of a drum, laser irradiation, toner application, and transferring and fixing of an image to a sheet.

The manipulation unit 13 includes a plurality of keys, such as a numerical keypad, an abbreviated key, a start key, a stop key, and various function keys, which are used to utilize each function of the network multifunction peripheral 1. The display unit 14 is a display device in which an LCD or the like is used, and displays an operating state of the network multifunction peripheral 1 and/or various setting contents. The read unit 15 includes a light source and a CCD. The read unit 15 reads a document such as a paper document in each line according to set sub-scanning line density to produce the image data.

The codec 16 compression-codes the image data read by the read unit 15, and decodes the compression-coded image data. The image storage unit 17 includes a DRAM. The image data compression-coded by the codec 16, the FAX-received image data, and the image data that is received from the external PC 30 and compression-coded are stored in the image storage unit 17.

The modem (modulator/demodulator) 18 modulates and demodulates between a digital signal and an analog signal. The modem 18 generates and detects various pieces of function information such as a digital command signal (DCS). The Network Control Unit (NCU) 19 is connected to the modem 18 to control the connection between the modem 18 and a Public Switched Telephone Network (PSTN) 50. The NCU 19 includes a function of transmitting a calling signal corresponding to a facsimile number of a destination and a function of detecting the incoming facsimile number.

The IFAX control unit 20 controls an IFAX function that utilizes an Internet environment. The IFAX control unit 20 includes a function of transmitting an electronic mail according to a Simple Mail Transfer Protocol (SMTP) and a function of receiving the electronic mail according to a Post Office Protocol (POP). The IFAX control unit 20 attaches to the electronic mail a transmitted document as the image data in a TIFF format or the like and transmits the electronic mail to a mail address (SMTP server). The IFAX control unit 20 receives the electronic mail from a POP server in every set time to print out the attached file. The Web server 21 can access pieces of data such as a home page described in HTML, a log-in page, and a facsimile manipulation page from the PC 30 to perform a predetermined HTTP task.

Figure 3:
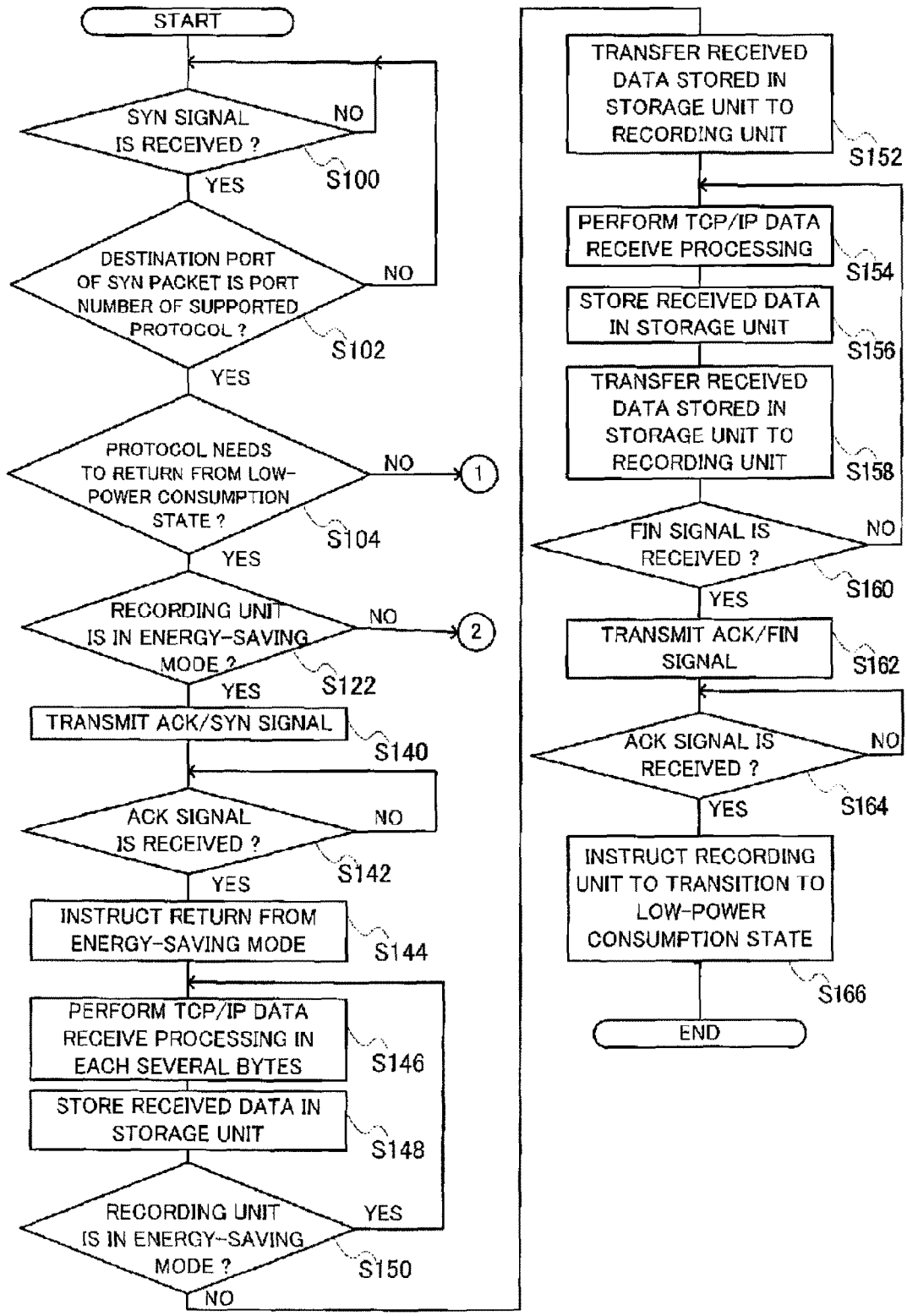
FIG. 3 is a flowchart (first page) illustrating a first processing procedure of communication processing (persistent connection control processing) performed by the network multifunction peripheral.
Figure 4:
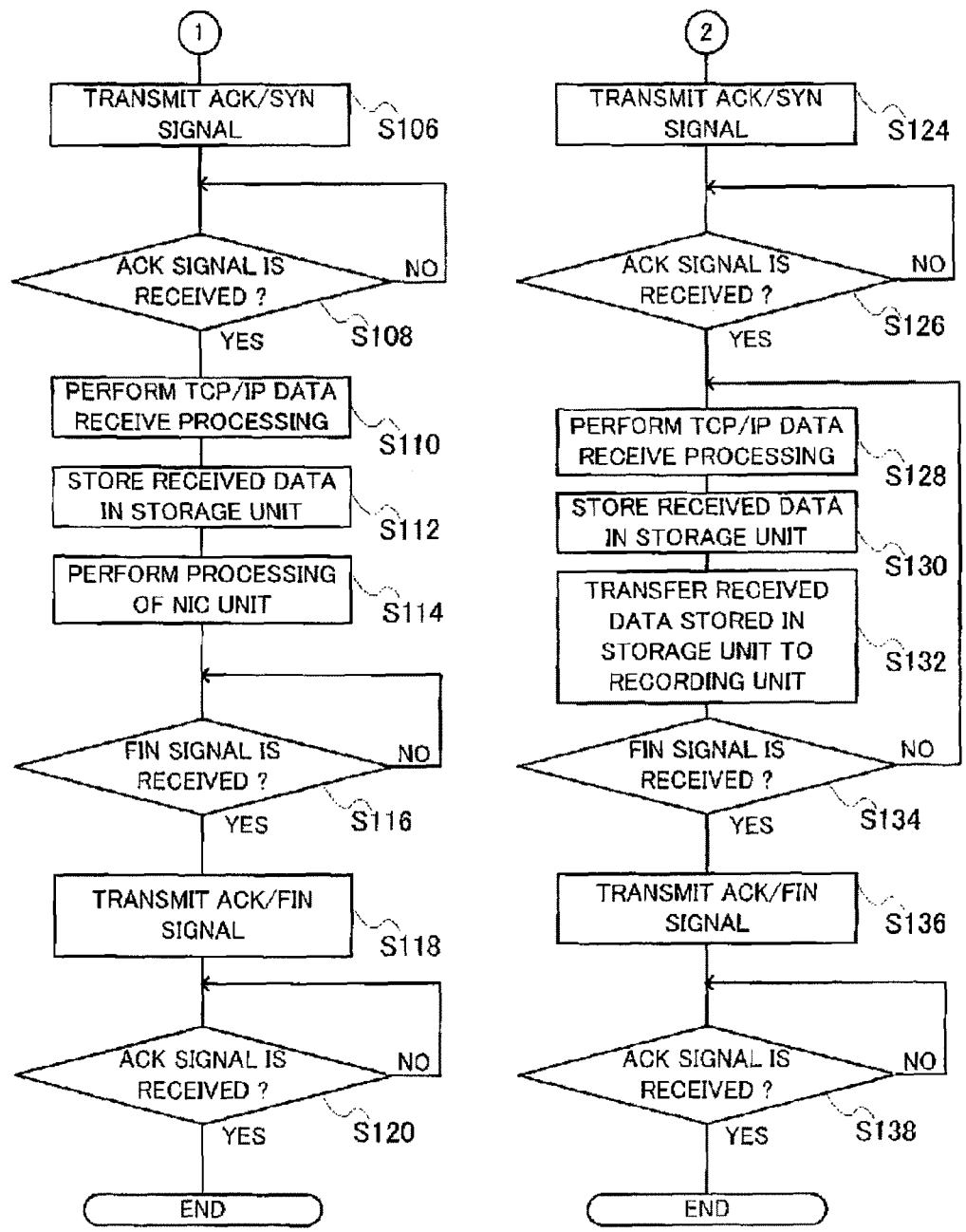
FIG. 4 is a flowchart (second page) illustrating the first processing procedure of the communication processing (persistent connection control processing) performed by the network multifunction peripheral.
Figure 5:
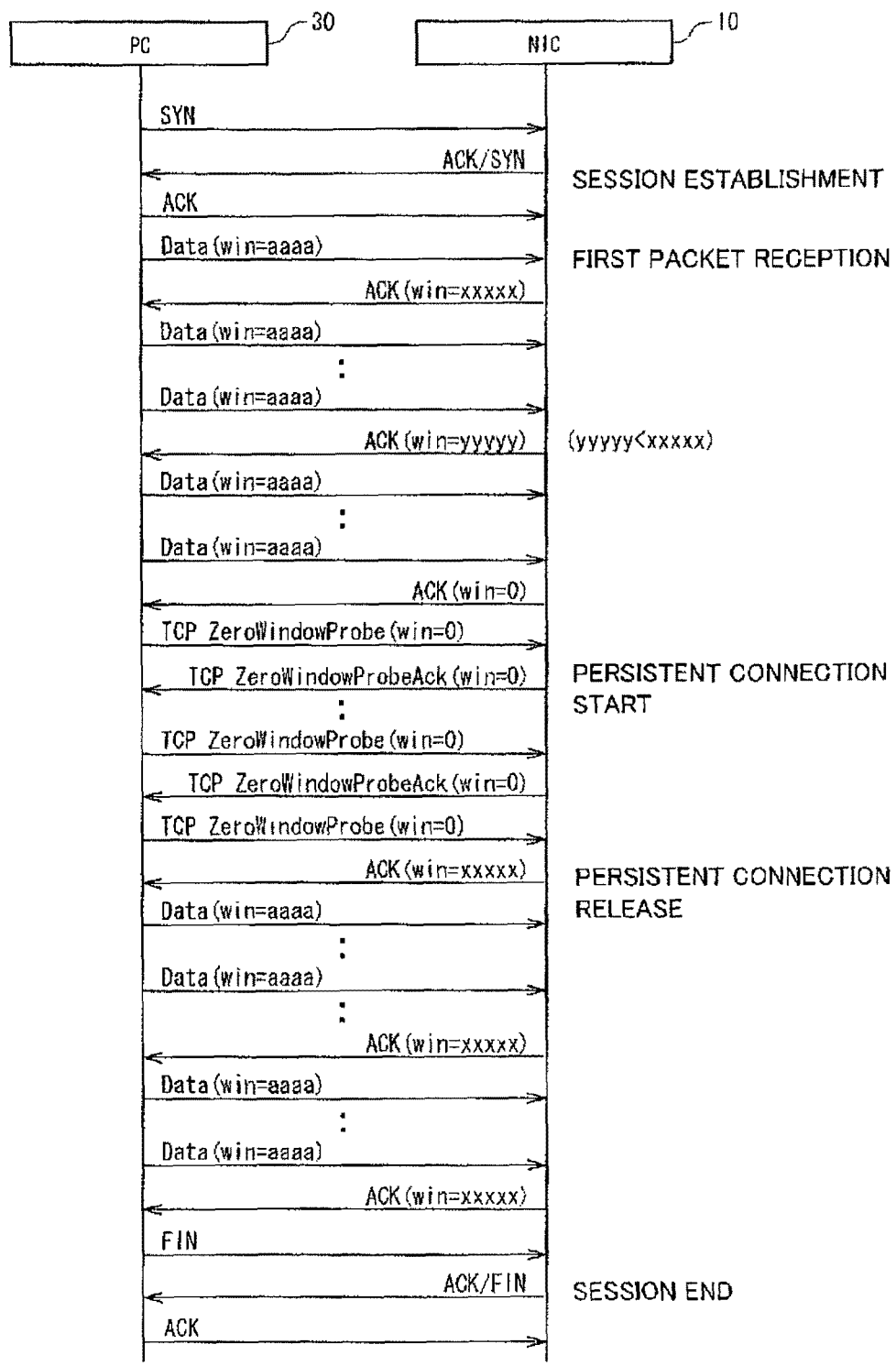
FIG. 5 is a sequence diagram illustrating a communication procedure between the NIC and a PC in the first processing procedure.

An operation of the network multifunction peripheral 1 will be described below with reference to FIGS. 3 to 5. FIG. 3 is a first page of a flowchart illustrating a first processing procedure of communication processing (persistent connection control processing) performed by the network multifunction peripheral 1. FIG. 4 is a second page of the flowchart. FIG. 5 is a sequence diagram illustrating a communication procedure between the NIC 10 and the PC 30 in the first processing procedure.

In step S100, a determination is made as to whether an SYN signal is received, that is, whether a session establishment request (SYN signal) exists. When the SYN signal is not received, the processing in step S100 is repeatedly performed until the SYN signal is received. On the other hand, when the SYN signal is received, the processing proceeds to step S102.

In step S102, a determination is made as to whether a destination port of the SYN signal is a port number of the protocol supported by the network multifunction peripheral 1. The processing proceeds to step S104 when the destination port of the SYN signal is the port number of the protocol supported by the network multifunction peripheral 1. On the other hand, when the destination port of the SYN signal is the port number of the protocol that is not supported by the network multifunction peripheral 1, the processing proceeds to step S100 to perform the pieces of processing in steps S100 and S102 again.

In step S104, a determination is made as to whether the protocol needs to return from the low-power consumption state based on received data. When it is determined that the protocol needs to return from the low-power consumption state, the processing proceeds to step S122. On the other hand, when it is determined that the protocol need not return from the low-power consumption state, the processing proceeds to step S106 of FIG. 4.

In step S106, an ACK/SYN signal is transmitted in response to the received SYN signal. Subsequently, in step S108, a determination is made as to whether the ACK signal is received from the PC 30 as a response to the transmitted ACK/SYN signal. When the ACK signal is received, the session is established with the source, and the processing proceeds to step S110. On the other hand, when the ACK signal is not yet received, the processing in step S108 is repeatedly performed until the ACK signal is received.

When the session is established, the TCP/IP data (print data) receive processing is performed in step S110. Subsequently, in step S112, the received TCP/IP data is stored in the storage unit 101. Then, in step S114, the NIC 10 performs response processing to the data.

Next, in step S116, a determination is made as to whether a FIN signal is received from the PC 30. When the FIN signal is not received, the processing in step S116 is repeatedly performed until the FIN signal is received. On the other hand, when the FIN signal is received, an ACK/FIN signal is returned to the PC 30 in step S118. Then, in step S120, a determination is made as to whether the ACK signal is received from the PC 30. When the ACK signal is not received, the processing in step S120 is repeatedly performed until the ACK signal is received. On the other hand, when the ACK signal is received, the session is released to end the processing.

On the other hand, when the affirmative determination is made in step S104, that is, when it is determined that the protocol needs to return from the low-power consumption state, in step S122, a determination is made as to whether the recording unit 12 (network multifunction peripheral 1) is in the low-power consumption state. When it is determined that the recording unit 12 is in the normal power state, the processing proceeds to step S124 of FIG. 4. On the other hand, when it is determined that the recording unit 12 is in the low-power consumption state, the processing proceeds to step S140.

In step S124, the ACK/SYN signal is transmitted as a response to the received SYN signal. Subsequently, in step S126, a determination is made as to whether the ACK signal is received from the PC 30 as the response to the transmitted ACK/SYN signal. When the ACK signal is received, the session is established with the PC 30, and the processing proceeds to step S128. On the other hand, when the ACK signal is not yet received, the processing in step S126 is repeatedly performed until the ACK signal is received.

When the session is established, the receive processing of the TCP/IP data is performed in step S128. Subsequently, in step S130, the received TCP/IP data is stored in the storage unit 101. Then, in step S132, the received data stored in the storage unit 101 is transferred to the recording unit 12.

Next, in step S134, a determination is made as to whether the FIN signal is received from the PC 30. When the FIN signal is not received, the processing proceeds to step S128, and the pieces of processing in steps S128 to S134 are repeatedly performed. On the other hand, when the FIN signal is received, the ACK/FIN signal is returned to the source in step S136. Then, in step S138, a determination is made as to whether the ACK signal is received from the source. When the ACK signal is not received, the processing in S138 is repeatedly performed until the ACK signal is received. On the other hand, when the ACK signal is received, the session is released to end the processing.

When it is determined that the recording unit 12 (network multifunction peripheral 1) is in the low-power consumption state in step S122, the ACK/SYN signal is transmitted as the response to the received SYN signal in step S140. When the ACK/SYN signal is not returned, the PC 30 that has transmitted the session establishment request repeatedly transmits the session establishment request while a transmission interval is gradually increased, for example, 6 seconds, 12 seconds, 24 seconds, 48 seconds, and 72 seconds. When the ACK/SYN signal is not returned after the elapse of 72 seconds, the session establishment request processing is terminated. Subsequently, in step S142, a determination is made as to whether the ACK signal is received from the PC 30 as the response to the transmitted ACK/SYN signal. When the ACK signal is received, the session is established with the PC 30, and the processing proceeds to step S144. On the other hand, when the ACK signal is not yet received, the processing in step S142 is repeatedly performed until the ACK signal is received.

In step S144, the start-up signal is outputted to start up the recording unit 12, and the supply of the power to the recording unit 12 is started. Subsequently, in step S146, the received data is read in each several bytes (for example, ten bytes) from the receive buffer 100*f* using the recv function. The receivable data amount corresponding to the free space of the receive buffer 100*f* is transmitted to the PC 30 according to TCP/IP (ACK (win=xxxx) and ACK (win=yyyy) illustrated in FIG. 5, where xxxx and yyyy represent the receivable data amount and xxxx>yyyy).

In step S148, the received data read from the receive buffer 100*f* is stored in the storage unit 101. Subsequently, in step S150, a determination is made as to whether the recording unit 12 has transitioned from the low-power consumption state to the normal power state (that is, whether the recording unit 12 is started up to become the state in which the print processing can be performed). When the recording unit 12 has transitioned to the normal power state, that is, when the start-up of the recording unit 12 is completed to be able to perform the print processing, the processing proceeds to step S152. On the other hand, when the recording unit 12 has not transitioned to the normal power state, that is, when the print processing cannot be performed because the recording unit 12 is being started up, the processing proceeds to step S146, and the pieces of processing in steps S146 to S150 are repeatedly performed. Meanwhile, because the data amount read from the receive buffer 100*f* becomes smaller than the data amount received from the PC 30, the free space of the receive buffer 100*f* is gradually decreased with elapse of time, and the value of zero (or a value close to zero) is transmitted as the receivable data amount to the PC 30 after the elapse of a predetermined time (ACK (win=0) illustrated in FIG. 5). More particularly, the ACK is returned to the PC 30 as the NIC 10 reads the received data. When receiving the ACK, the PC 30 transmits the next data (in one time or in a plurality of times). At this time, the PC 30 transmits the data while a packet size is set smaller than the received receivable data amount. Therefore, when the read of the received data is performed once, the data is received (one time or a plurality of times). Thus, in step S146, the received data is read such that the one read amount is smaller than the received data amount per one ACK. As a result, the transition is made to the persistent connection control in which transmission of the data transmitted from the PC 30 is suppressed while the session is maintained, and the persistent connection control is continuously performed until the recording unit 12 is started up.

More specifically, as illustrated in FIG. 5, when the network multifunction peripheral 1 returns the ACK (win=0) whose windows size is zero, the PC 30 regularly transmits a signal TCP Zero Window Probe (win=0) to ask whether the receive buffer 100*f* becomes empty. In response to this signal, the NIC 10 returns a signal TCP Zero Window Probe ACK (win=0) indicating that the free space does not exist in the receive buffer 100*f* while the persistent connection control is continued. That is, while the persistent connection control is maintained, the signal TCP Zero Window Probe ACK (win=0) is returned in response to the signal TCP Zero Window Probe (win=0). More particularly, when the free space of the receive buffer 100*f* is smaller than a predetermined value (for example, a half of the capacity of the receive buffer), the correct free space is not transmitted as the receivable data amount, but the value of zero is transmitted as the receivable data amount. Accordingly, even immediately after the transition is made from the persistent connection control to the normal control, the value of zero is transmitted as the receivable data amount until the free space reaches the predetermined value. Then, the correct free space is transmitted as the receivable data amount after the free space reaches the predetermined value. Instead of the value of zero, a value smaller than the minimum transmittable data amount of the PC 30 may be set to the receivable data amount.

When the start-up of the recording unit 12 is completed, the received data stored in the storage unit 101 is transferred to the recording unit 12 in step S152. Subsequently, in step S154, the persistent connection control is released, and the normal receive processing (the processing of reading the received data in each several K bytes from the receive buffer 100*f*) is performed to the TCP/IP data. Therefore, the free space of the receive buffer 100*f* is rapidly increased to release the persistent connection control, and the PC 30 is permitted to transmit the data. More specifically, when the persistent connection control is released, the read amount from the receive buffer 100*f* is considerably increased compared with the persistent connection control, and (instead of the signal TCP Zero Window Probe ACK (win=0)) the ACK (win=xxxx) indicating the receivable data amount is returned to the signal TCP Zero Window Probe (win=0) as illustrated in FIG. 5. Therefore, the PC 30 starts the data transmission.

Next, in step S156, the received TCP/IP data is stored in the storage unit 101. In step S158, the received data stored in the storage unit 101 is transferred to the recording unit 12.

Subsequently, in step S160, a determination is made as to whether the FIN signal is received from the PC 30. When the FIN signal is not received, the processing proceeds to step S154, and the pieces of processing in steps S154 to S160 are repeatedly performed. On the other hand, when the FIN signal is received, the ACK/FIN signal is returned to the source in step S162. Then, in step S164, a determination is made as to whether the ACK signal is received from the source. When the ACK signal is not received, the processing in step S164 is repeatedly performed until the ACK signal is received. On the other hand, when the ACK signal is received, the session is released, and the processing proceeds to step S166.

In step S166, a signal instructing the recording unit 12 (network multifunction peripheral 1) to transition to the low-power consumption state is outputted to stop (cut off) the supply of the power to the recording unit 12 (network multifunction peripheral 1) except the NIC 10. Then the processing is ended.

According to the present embodiment, the network multifunction peripheral 1 includes the NIC 10, the control unit 11, and the recording unit 12 to the Web server 21. For example, during standby, the recording unit 12 and the like transition to the low-power consumption state (energy-saving mode), and only the NIC 10 runs to perform the data waiting operation. Therefore, during the waiting for the data, because the network multifunction peripheral 1 can transition to the low-power consumption state except for a part of the network multifunction peripheral 1, that is, the NIC 10, the power consumption of the network multifunction peripheral 1 can be reduced. When the session establishment request signal is received through the LAN 51, the session is established with the PC 30, and the start-up signal is outputted to the recording unit 12. Until the recording unit 12 is started up, the persistent connection control that prohibits the PC 30 from transmitting the data is performed while the session is maintained. Therefore, irrespective of the protocol used and the OS of the PC 30 that is the data source, the data transmission from the PC 30 can be controlled (prohibited/permitted) when the recording unit 12 is being started up from the low-power consumption state.

According to the present embodiment, until the recording unit 12 is started up, the data amount read from the receive buffer 100*f* is decreased compared with the non-persistent connection control (that is, the normal control) such that the receivable data amount is smaller than the minimum transmittable data amount of the PC 30. Therefore, because the data amount read from the receive buffer 100*f* becomes smaller than the data amount received from the PC 30, the free space of the receive buffer 100*f* is reduced, and the value (typically, zero) smaller than the minimum transmittable data amount of the PC 30 is transmitted as the receivable data amount to the PC 30. As a result, transmission of the data transmitted from the PC 30 can be suppressed, that is, the persistent connection control can be realized while the session is maintained.

Further, according to the present embodiment, the persistent connection control is ended when the recording unit 12 is started up to be able to print out the print data. Therefore, the PC 30 is permitted to transmit the data. Because the session is already maintained at the end of the persistent connection control, the data communication can be rapidly started.

Moreover, according to the present embodiment, when the recording unit 12 is started up to end the persistent connection control, the data amount read from the receive buffer 100*f* is increased compared with the persistent connection control, and the free space (that is, the receivable data amount) of the receive buffer 100*f* is set larger than the minimum transmittable data amount of the PC 30. The data size corresponding to the free space is transmitted as the receivable data amount to the PC 30 that has transmitted the session establishment request signal. Therefore, the PC 30 can transmit the transmitted data, and the transition from the persistent connection control to the normal control is smoothly made after the recording unit 12 is started up.

Moreover, according to the present embodiment, the recording unit 12 is started up only when the recording unit 12 needs to be started up. Therefore, because the running time of the recording unit 12 can be suppressed to the minimum level, the power consumption of the network multifunction peripheral 1 can further be reduced.

Moreover, according to the present embodiment, when the recording unit 12 does not need to be started up, the response to the received data is performed on the side of the NIC 10 without starting up the recording unit 12. Therefore, since the unnecessary start-up of the recording unit 12 can be prevented, the power consumption of the network multifunction peripheral 1 can further be reduced.

[Second Control Mode]

Figure 6:
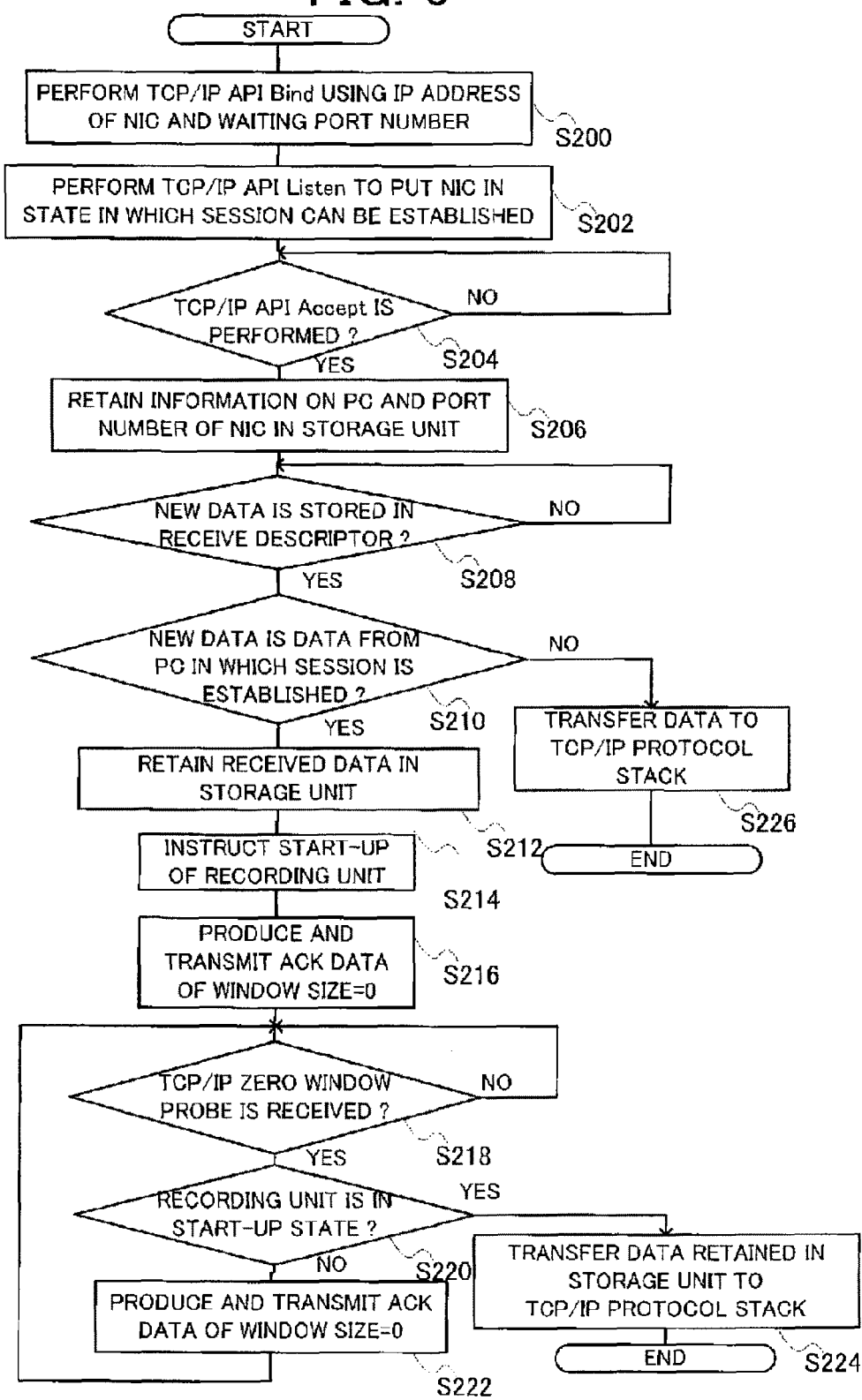
FIG. 6 is a flowchart illustrating a second processing procedure of the communication processing (persistent connection control processing) performed by the network multifunction peripheral.
Figure 7:
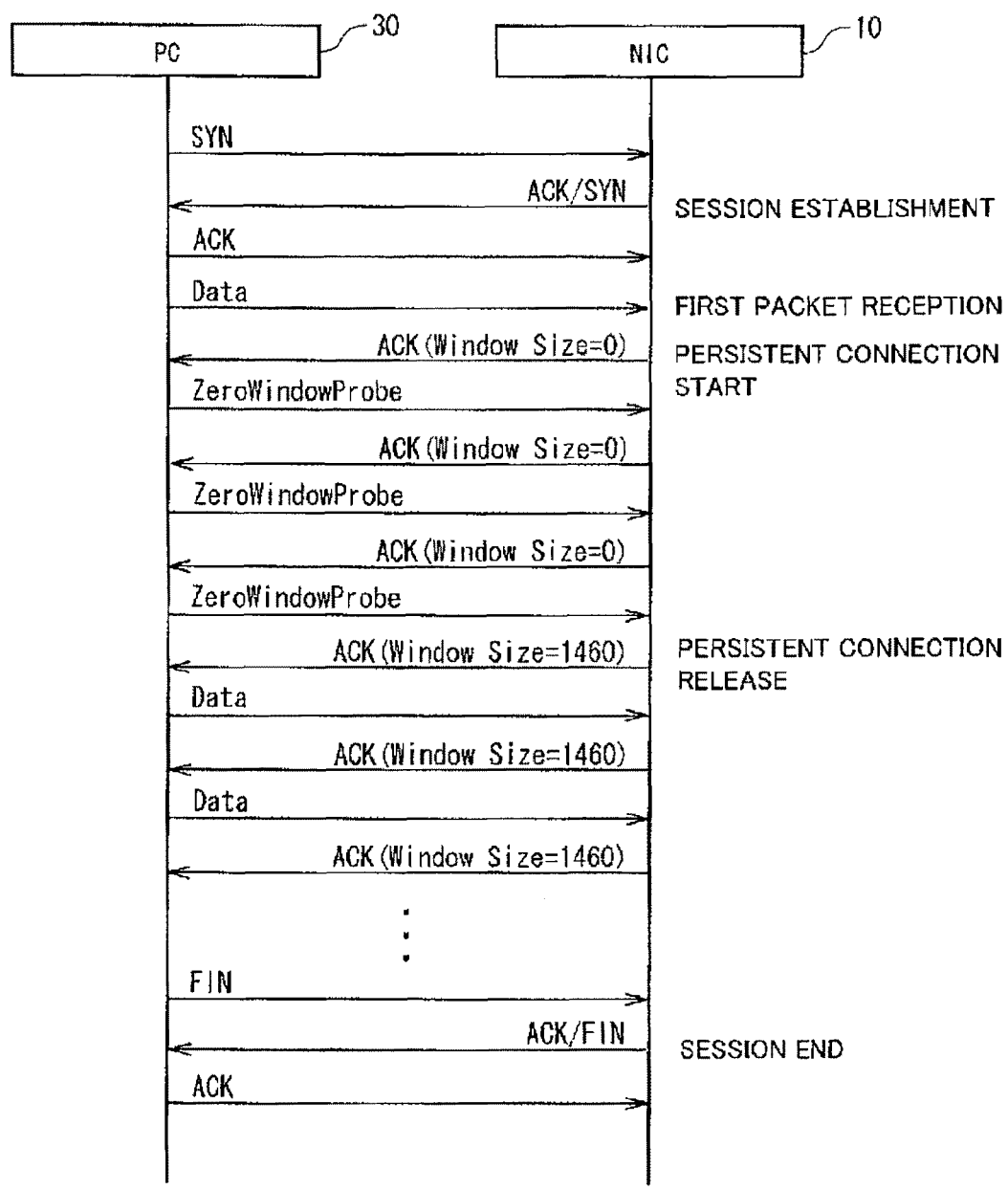
FIG. 7 is a sequence diagram illustrating a communication procedure between the NIC and the PC in the second processing procedure.

In the above-described control mode, the persistent connection control unit 106 adjusts the amount (that is, the receivable data amount) of received data read from the receive buffer 100*f*, thereby realizing the persistent connection control. However, the persistent connection control may also be realized by transmitting the value (for example, zero) smaller than the minimum transmittable data amount of the PC 30 as the receivable data amount of the network multifunction peripheral 1 to the PC 30 irrespective of the actual receivable data amount until it is determined that the recording unit 12 is started up. A second control mode of the persistent connection control will be described below with reference to FIGS. 6 and 7. FIG. 6 is a flowchart illustrating a second processing procedure of the communication processing (persistent connection control processing) performed by the network multifunction peripheral 1. FIG. 7 is a sequence diagram illustrating a communication procedure between the NIC 10 and the PC 30 in the second processing procedure.

In step S200, TCP/IP API Bind is performed using an IP address of the NIC 10 and a waiting port number. Therefore, a socket that accepts a job is correlated (that is, bound) with a local address that includes the IP address and the port number. Subsequently, in step S202, TCP/IP API Listen is performed to put the NIC 10 in the state in which the session can be established. Therefore, the socket bound in step S200 can wait for the session establishment request (connection request).

Subsequently, in step S204, a determination is made as to whether TCP/IP API Accept processing is performed. The TCP/IP API Accept processing is performed to accept the session establishment request, thereby establishing the session. More specifically, as illustrated in FIG. 7, the session is established by returning the ACK/SYN signal in response to the SYN signal. Then, the processing proceeds to step S206. On the other hand, when the TCP/IP API Accept processing is not performed, the processing in step S204 is repeatedly performed until the TCP/IP API Accept processing is performed.

In step S206, information on the PC 30 in which the session is established and the port number of the NIC 10 are retained in the storage unit 101. Subsequently, in step S208, a determination is made as to whether the new received data (Ethernet frame) is stored in the receive buffer 100*f* (receive descriptor). When the new received data is not stored in the receive buffer 100*f*, the processing in step S208 is repeatedly performed until the new received data is stored. On the other hand, when the new received data is stored, the processing proceeds to step S210.

In step S210, a determination is made as to whether the data of the receive buffer 100*f* (receive descriptor) is the received data from the PC 30 in which the session is established. When the data of the receive buffer 100*f* is not the received data from the PC 30 in which the session is established, the received data is transferred to a TCP/IP protocol stack in step S226, and the processing is at once ended. On the other hand, when the data of the receive buffer 100*f* is the received data from the PC 30 in which the session is established, the processing proceeds to step S212.

In step S212, the received data (Ethernet frame) is retained in the storage unit 101. Subsequently, in step S214, the start-up signal is outputted to the recording unit 12 in the low-power consumption state in order to start up the recording unit 12, and the supply of the power to the recording unit 12 is started.

Then, in step S216, the ACK data (Ethernet frame) whose windows size is zero is produced and stored in the transmit buffer 100*g* (transmit descriptor), and the ACK data is returned (ACK (Window Size=0) illustrated in FIG. 7).

Next, in step S218, a determination is made as to whether the signal TCP Zero Window Probe (win=0) is received from the PC 30. The signal TCP Zero Window Probe (win=0) is used to ask whether the receive buffer 100*f* is empty. When the signal is not received, the processing in step S218 is repeatedly performed until the signal is received. On the other hand, when the signal is received, the processing proceeds to step S220.

In step S220, a determination is made as to whether the recording unit 12 has transitioned from the low-power consumption state to the normal power state, that is, whether the recording unit 12 is started up to become the state in which the print processing can be performed. When the recording unit 12 has not transitioned to the normal power state, that is, when the print processing cannot be performed because the recording unit 12 is being started up, the processing proceeds to step S222. On the other hand, when the recording unit 12 has transitioned to the normal power state, that is, when the start-up of the recording unit 12 is completed to be able to perform the print processing, the processing proceeds to step S224.

When the recording unit 12 is being started up, the persistent connection control is continuously performed. That is, the NIC 10 returns the signal ACK (Window Size=0) indicating that the free space does not exist in the receive buffer 100*f* (see FIG. 7). That is, the signal ACK (Window Size=0) is returned in response to the signal TCP Zero Window Probe while the persistent connection control is maintained. In this case, the value of zero is transmitted as the receivable data amount irrespective of the actual free space (receivable data amount) of the receive buffer 100*f*. Then the processing proceeds to step S218, and the pieces of processing in steps S218 to S222 are repeatedly performed to perform the persistent connection control until the recording unit 12 is started up.

When the recording unit 12 transitions to the normal power state, that is, when the start-up is completed to be able to perform the print processing, the received data (Ethernet frame) that is received and stored in the storage unit 101 is transferred to the recording unit 12 through the TCP/IP protocol stack in step S224. The persistent connection control is released to perform normal return processing (ACK (window size=1460) illustrated in FIG. 7). Then the processing is at once ended.

According to the present embodiment, the persistent connection control can be achieved by directly manipulating the receivable data amount included in the transmitted data without adjusting the read amount from the receive buffer 100*f*. Therefore, irrespective of the protocol used and the OS of the PC 30 that is the data source, the data transmission from the PC 30 can be more properly controlled (prohibited/permitted) when the recording unit 12 is being started up from the low-power consumption state.

Although the embodiment of the present invention has been described above, the present invention is not limited to the above embodiment, but various modifications can be made. In the above embodiment, the network multifunction peripheral is described as the network device according to the present invention by way of example. However, the network device of the present invention is not limited to the network multifunction peripheral. For example, the network device of the present invention may be a network home electrical appliance such as a television, a machine tool, an industrial machine, and an unmanned carrier that are used while connected to the network.

In the above embodiment, the recording unit 12 that can be put in the low-power consumption state is described by way of example. However, the similar processing may be performed to the IFAX control unit 20, the Web server 21, and the like. In the above embodiment, the recording unit 12 (network multifunction peripheral 1) can be put in the low-power consumption state (energy-saving mode) and the normal power state (normal mode). Alternatively, the recording unit 12 may be put in more power states, for example, the recording unit 12 may further be put in a standby state (standby mode) as an intermediate state. In this case, after the transition from the low-power consumption state to the standby state is made to perform the data processing in the standby state, the transition from the standby state to the low-power consumption state may be made.

In the above embodiment, the PC is used as the communication terminal. However, the communication terminal is not limited to the PC. For example, the network multifunction peripheral may be used as the communication terminal. In addition, the communication protocol used is not limited to that of the above embodiment.

In the above embodiment, when the network multifunction peripheral is in the low-power consumption state, the power is supplied to the whole of the NIC 10. However, the present invention is not limited to such a configuration. For example, the NIC may include a plurality of portions, and the power may be supplied to only a part of the NIC while the supply of the power to other portions of the NIC is stopped when the network multifunction peripheral is in the low-power consumption state.

While the present invention has been described with respect to preferred embodiments thereof, it will be apparent to those skilled in the art that the disclosed invention maybe modified in numerous ways and may assume many embodiments other than those specifically set out and described above. Accordingly, it is intended by the appended claims to cover all modifications of the present invention that fall within the true spirit and scope of the present invention.

What is claimed is:

1. A network device comprising: a communication unit for conducting communication with a communication terminal, the communication unit being connected to the communication terminal through a network; and a processing unit that is put in a first power state and a second power state whose power consumption is smaller than that of the first power state, the processing unit being connected to the communication unit through a communication channel, the processing unit processing received data received from the communication unit when the processing unit is in the first power state, wherein the communication unit includes: a transmit-receive unit for transmitting and receiving data to and from the communication terminal through the network; a determination unit for determining the power state of the processing unit; a transition unit for outputting a transition signal for causing the power state of the processing unit to transition to the first power state, when the transmit-receive unit receives the data from the communication terminal and when the determination unit determines that the processing unit is in the second power state; and a persistent connection control unit for establishing a session with the communication terminal when the transmit-receive unit receives a session establishment request signal from the communication terminal and when the transition unit outputs a transition signal, the persistent connection control unit performing persistent connection control to prohibit the communication terminal from transmitting data while the session is maintained until the power state of the processing unit transitions to the first power state;

wherein the communication unit includes a receive buffer in which received data received from the communication terminal is temporarily stored, the transmit-receive unit transmits a receivable data amount corresponding to a free space of the receive buffer to the communication terminal according to a predetermined communication protocol, and the persistent connection control unit decreases a data amount read from the receive buffer compared with non-persistent connection control such that the receivable data amount is smaller than a minimum transmittable data amount of the communication terminal until the determination unit determines that the power state of the processing unit has transitioned to the first power state.

2. The network device according to claim 1 wherein the persistent connection control unit ends the persistent connection control to permit the communication terminal that has transmitted the session establishment signal to transmit the data when the determination unit determines that the power state of the processing unit has transitioned to the first power state.

3. The network device according to claim 2, wherein the persistent connection control unit increases the data amount read from the receive buffer compared with the persistent connection control such that the receivable data amount is larger than the minimum transmittable data amount of the communication terminal when ending the persistent connection control to permit the communication terminal that has transmitted the session establishment signal to transmit the data.

4. The network device according to claim 1, wherein the predetermined communication protocol is TCP/IP.

5. The network device according to claim 1, wherein the transmit-receive unit transmits a value of zero as the receivable data amount to the communication terminal when the free space of the receive buffer is smaller than a predetermined value while the persistent connection control unit performs the persistent connection control.

6. The network device according to claim 1, wherein the communication unit includes a storage unit in which the received data read from the receive buffer is stored, and the received data stored in the storage unit is transferred to the processing unit when the determination unit determines that the power state of the processing unit has transitioned to the first power state.

7. The network device according to claim 1, wherein the communication unit includes a transition determination unit for determining whether the power state of the processing unit needs to be transitioned to the first power state when the data is received by the transmit-receive unit and when the determination unit determines that the processing unit is in the second power state, the transition unit outputs the transition signal when the transition determination unit determines that the power state of the processing unit needs to be transitioned to the first power state, and the persistent connection control unit prohibits the communication terminal from transmitting the data while the session is maintained until the power state of the processing unit transitions to the first power state, when the transition determination unit determines that the power state of the processing unit needs to be transitioned to the first power state.

8. The network device according to claim 7, wherein the communication unit includes a production unit for producing a response to the data received by the transmit-receive unit when the transition determination unit determines that the power state of the processing unit need not be transitioned to the first power state, and the transmit-receive unit outputs the response produced by the production unit to the communication terminal when the transition determination unit determines that the power state of the processing unit need not be transitioned to the first power state.

9. The network device according to claim 1, wherein the processing unit is a printer that prints out print data received by the communication unit onto a sheet.

10. The network device according to claim 1, wherein the persistent connection control unit controls the transmit-receive unit such that a value smaller than a minimum transmittable data amount of the communication terminal is transmitted as the receivable data amount to the communication terminal according to a predetermined communication protocol, until the determination unit determines that the power state of the processing unit has transitioned to the first power state.

11. The network device according to claim 1, wherein the communication unit includes a receive buffer in which received data received from the communication terminal is temporarily stored, the transmit-receive unit transmits a receivable data amount corresponding to a free space of the receive buffer to the communication terminal according to a predetermined communication protocol, and the persistent connection control unit controls the transmit-receive unit such that a value smaller than a minimum transmittable data amount of the communication terminal is transmitted as a receivable data amount irrespective of the receivable data amount according to a predetermined communication protocol, until the determination unit determines that the power state of the processing unit has transitioned to the first power state.

12. The network device according to claim 1, wherein the communication unit includes a receive buffer in which received data received from the communication terminal is temporarily stored.

* * * * *